No. 736,010.
Patented August 11, 1903.

UNITED STATES PATENT OFFICE.

CARL V. PETRAEUS, OF IOLA, KANSAS.

METHOD OF SMELTING ZINC OXID.

SPECIFICATION forming part of Letters Patent No. 736,010, dated August 11, 1903.

Application filed November 19, 1901. Serial No. 82,866. (No specimens.)

*To all whom it may concern:*

Be it known that I, CARL V. PETRAEUS, a citizen of the United States of America, residing in Iola, in the county of Allen, in the State of Kansas, have invented a certain new and useful Improvement in Methods of Smelting Zinc Oxid, of which the following is a true and exact description.

My invention relates to a method of smelting sublimated zinc oxid, and has for its object the economical production of metallic zinc from such material and also securing any other valuable metals which may exist in admixture with the zinc oxid.

The chief drawback to the smelting of zinc oxid as heretofore attempted is the exceedingly bulky and light character of the material, which makes it, as a rule, impracticable to charge a sufficient quantity into the retorts of the smelting-furnace to produce zinc in sufficient quantity to pay for the expenses of treatment. Another difficulty found in the smelting of zinc oxid as heretofore attempted has been that quite large portions of the oxid charged into the retorts are not smelted, this being chiefly due to an insufficiently thorough commingling of carbon with the oxid, a thorough mixture being difficult to make, owing to the light character of the oxid. Still another difficulty heretofore met with has been due to the presence of a small amount of sulfur in combination with the zinc in the oxid, as zinc sulfate or sulfid. This causes a zinc loss in the zinc-distillation process, as zinc thus combined will not be reduced to the metallic state by carbon in the zinc-retorts.

I have discovered that by treating the oxid at a red heat in a reverberatory or similar furnace I can not only drive out the sulfur present, but also alter the physical condition of the oxid, making it much more dense and less bulky, so that not only can large quantities be charged into the retorts, but also a more intimate mixture with carbon can be effected. It is highly desirable that the mixture of densified zinc oxid and carbon should be wet when charged into the retorts, and while the mixture can be wetted after it is made I have found that much the best product for charging into the retorts is made by bringing the zinc oxid in admixture with water to the consistency of a paste and then intimately mixing finely-divided carbon in this paste by thoroughly working them together, and I desire to note that it is of the utmost importance for successful working that the mixture of carbon and zinc oxid should be of the most thorough character, for which purpose carbon in considerable excess of that necessary for reduction should be added.

My invention accordingly consists in the method of making metallic zinc by first heating the sublimated oxid to a red heat (in practice I heat to from 1,200° to 1,400° Fahrenheit) in order to eliminate sulfur and densify the material, then intimately mixing with the densified zinc oxid finely-divided carbon, and finally smelting the mixture in retort-furnaces, the best results being attained, as already stated, by wetting the mixture and preferably by forming a wet mixture by thoroughly mixing the carbon with a pasty mixture of the densified oxid.

I am aware that in his Patent No. 489,460 Parker C. Choate has described a treatment of zinc oxid containing lead in admixture in which the oxid is heated to a temperature of from 300° to 800° Fahrenheit to drive off the compounds more volatile than zinc and by the cintering of the lead present to effect a granulation and contraction of the mass. My invention, however, has for its object to effect an actual densification of the zinc oxid, which I effect at the same time that I eliminate the sulfur present, by heating the zinc oxid to a temperature indicated by a red heat, said temperature being much above 800° Fahrenheit, at which red heat the zinc oxid is densified irrespective of the presence of any lead.

Having now described my invention, what I claim as new, and desire to secure by Letters Patent, is—

1. The method of making zinc from sublimated zinc oxid which consists in first heating the oxid to a red heat to eliminate sulfur and condense the zinc oxid, then intimately mixing the densified oxid with carbon and finally smelting the mixture in retort-furnaces.

2. The method of making zinc from sublimated zinc oxid which consists in first heating the oxid to a red heat to eliminate sulfur and condense the zinc oxid, then intimately mixing the densified oxid with the carbon and wetting the mass prior to charging it into the retorts, and finally smelting the mixture in retort-furnaces.

3. The method of making zinc from sublimated zinc oxid which consists in first heating the oxid to a red heat to eliminate sulfur and condense the zinc oxid, then mixing the densified oxid with water and bring the mixture to the consistency of a paste, then mixing finely-divided carbon intimately in the pasty oxid and finally smelting the mixture in retort-furnaces.

CARL V. PETRAEUS.

Witnesses:
EDWD. C. REGAN,
D. STEWART.